United States Patent
Lin

(10) Patent No.: US 6,286,729 B1
(45) Date of Patent: Sep. 11, 2001

(54) FEEDING DEVICE FOR A CAULKING GUN

(75) Inventor: Han-Chang Lin, Chang Hua Hsien (TW)

(73) Assignee: Kae Chih Enterprise Co., Ltd. (TW)

( * ) Notice: Subject to any disclaimer, the term of this patent is extended or adjusted under 35 U.S.C. 154(b) by 0 days.

(21) Appl. No.: 09/715,318

(22) Filed: Nov. 17, 2000

(51) Int. Cl.[7] ................................................. G01F 11/00
(52) U.S. Cl. ............................................. 222/391; 222/326
(58) Field of Search ...................................... 222/391, 326

(56) References Cited

U.S. PATENT DOCUMENTS

| | | | | |
|---|---|---|---|---|
| 2,367,346 | * | 1/1945 | Good | 222/391 |
| 4,090,639 | * | 5/1978 | Campbell et al. | 222/391 |
| 5,823,403 | * | 10/1998 | Schneider | 222/391 |

* cited by examiner

Primary Examiner—Kevin Shaver
Assistant Examiner—Patrick Buechner
(74) Attorney, Agent, or Firm—Thorp Reed & Armstrong, LLP

(57) ABSTRACT

A feeding device for a caulking gun includes a frame, a trigger, a plunger shaft, a drive grip, a brake grip, two springs and a pressure release rod. A first recess and a second recess are defined in the frame. The plunger shaft extends through the frame and penetrates the drive grip, in the first recess, and the brake grip, in the second recess. The pressure release rod is slidably mounted between the drive grip and the brake grip. When the drive grip is moved back, due to a spring force, and presses the pressure release rod, the brake grip is pressed, to release the engagement with the plunger shaft, which releases the pressure on the caulking compound in the tube. Consequently the caulking compound does not flow out of the tube unless the trigger is squeezed and caulking compound is saved.

6 Claims, 6 Drawing Sheets

FEEDING DEVICE FOR A CAULKING GUN

BACKGROUND OF THE INVENTION

1. Field of the Invention

The present invention relates to a feeding device, and more particularly to a feeding device for a caulking gun.

2. Description of Related Art

With reference to FIGS. 4 and 5, a conventional feeding device for a caulking gun in accordance with the prior art comprises a frame (50), a handle (51), a trigger (52), a plunger shaft (60), a drive grip (53) and a brake grip (54). A first recess (501) and a second recess (502) are defined in the frame (50). The handle (51) extends outward from the frame (50) below the second recess (502). The trigger (52) is pivotally mounted in the frame (50) forward of the handle (51). The plunger shaft (60) extends through the frame (50) and penetrates the drive grip (53) in the first recess (501) and the brake grip (54) in the second recess (502). The drive grip (53) and the brake grip (54) each has a through bole (not numbered) allowing the plunger shaft (60) to extend through the grips (53, 54). The diameter of the through holes in the drive grip (53) and the brake grip (54) are slightly larger than the diameter of the plunger shaft (60). A pin (521) is attached to one end of the trigger (52) and extends into the first recess (501) to push the drive grip (53). The drive grip (53) is inclined to the plunger shaft (60) for engaging with the plunger shaft (60) and driving the plunger shaft (60) forward to squeeze out the caulking compound when pushed by the pin (521) which is attached to the trigger (52). A first compression spring (531) is mounted around the plunger shaft (60) between the forward wall of the first recess (501) and the drive grip (53) to provide a restitution force to return the drive grip (53) and the trigger (52) back to a position to begin the next compression stroke. A groove (503) is defined in the top of the second recess (502), and a through hole (504) is defined in the rear wall of the second recess (502). The top edge of the brake grip (54) is held in the groove (503), and the other end extends down and aligns with the through hole (504). A second compression spring (541) is mounted around the plunger shaft (60) between the forward wall of the second recess (502) and the brake grip (54). The second spring (541) presses the brake grip (54) to selectively engage with the plunger shaft (60) and allow the plunger shaft (60) to move forward only.

With reference to FIGS. 4, 5 and 6, a button (55) is mounted in and extends through the through hole (504) in the rear wall of the second recess (502) in frame (50). The button (55) is pressed to push the brake grip (54) forward perpendicular to the plunger shaft (60) to release the plunger shaft (60) so that the plunger shaft (60) can be pulled back and the caulking gun can be loaded again.

The caulking compound for use with the caulking gun is in a tube. The tube has a nozzle that has a diameter smaller than that of the tube, and the caulking compound has a high viscosity and is slightly compressible so the pressure on the caulking compound in the tube is not immediately relieved when the plunger shaft (60) stops pressing the caulking compound. Rather, the caulking compound continues to squeeze out of the tube until the pressure stored in the caulking compound in the tube is fully relieved. Consequently, the caulking compound is wasted with too much caulking compound being applied to the parts being caulked or polluting the environment.

The present invention has arisen to mitigate and/or obviate the disadvantages of the conventional feed device for a caulking gun.

SUMMARY OF THE INVENTION

In accordance with one aspect of the present invention, a reactive feeding device for a caulking gun is provided. The feeding device for a caulking gun in accordance with the present invention has a pressure release rod slidably mounted between the drive grip and the brake grip. When the drive grip and the trigger are moved back to the position to start the next compression stroke by the spring, the drive grip presses the pressure release rod that presses the brake grip, which releases the plunger shaft and immediately relieves the pressure in the tube. Consequently, the caulking compound does not flow out of the tube unless the trigger is squeezed so caulking compound is saved.

Further benefits and advantages of the present invention will become apparent after a careful reading of the detailed description with appropriate reference to the accompanying drawings.

DETAILED DESCRIPTION OF THE INVENTION

Figure 1:
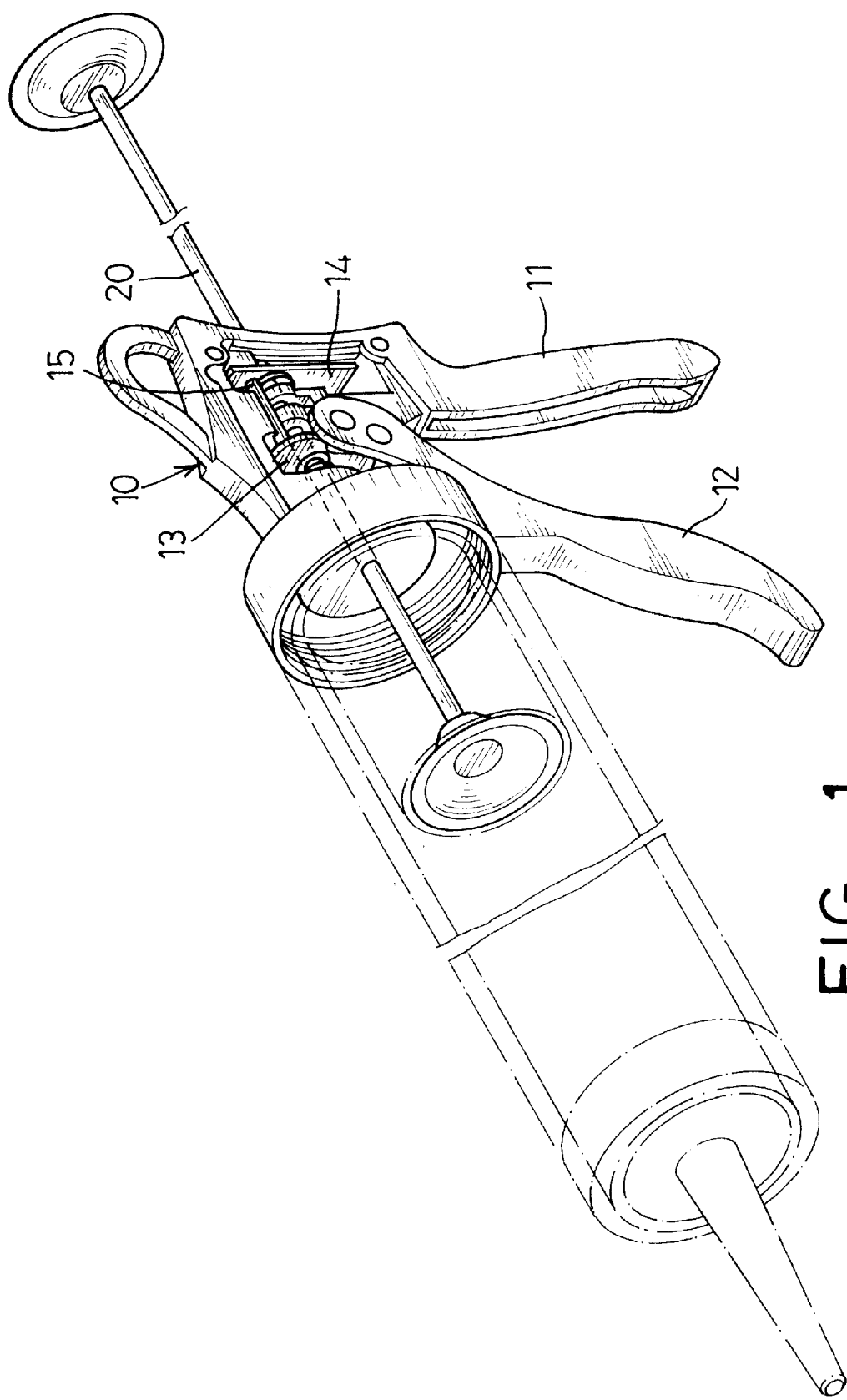
FIG. 1 is a perspective view of a feeding device for a caulking gun in accordance with the present invention.
Figure 2:
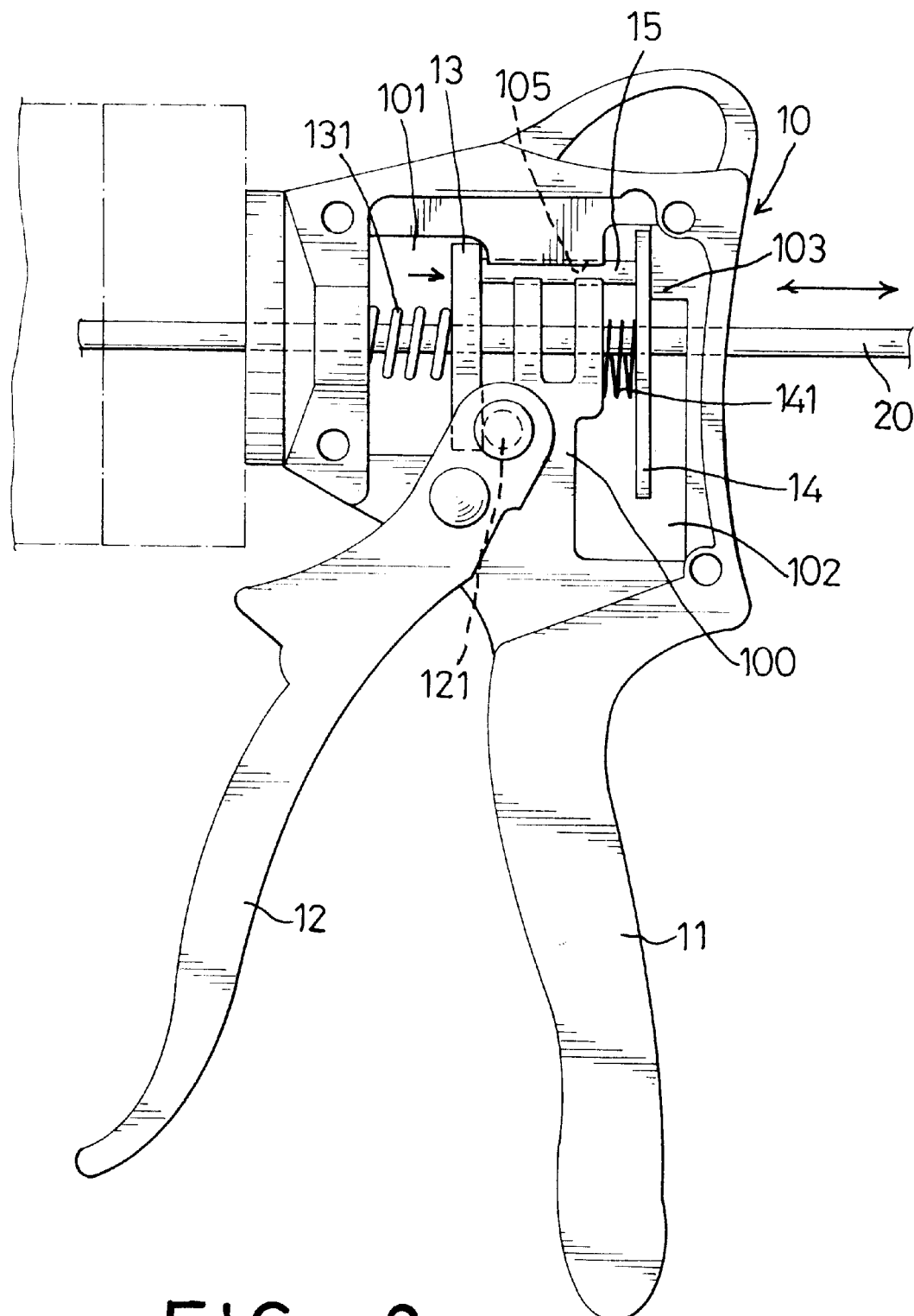
FIG. 2 is a side plan view of the feeding device for a caulking gun in FIG. 1.
Figure 3:
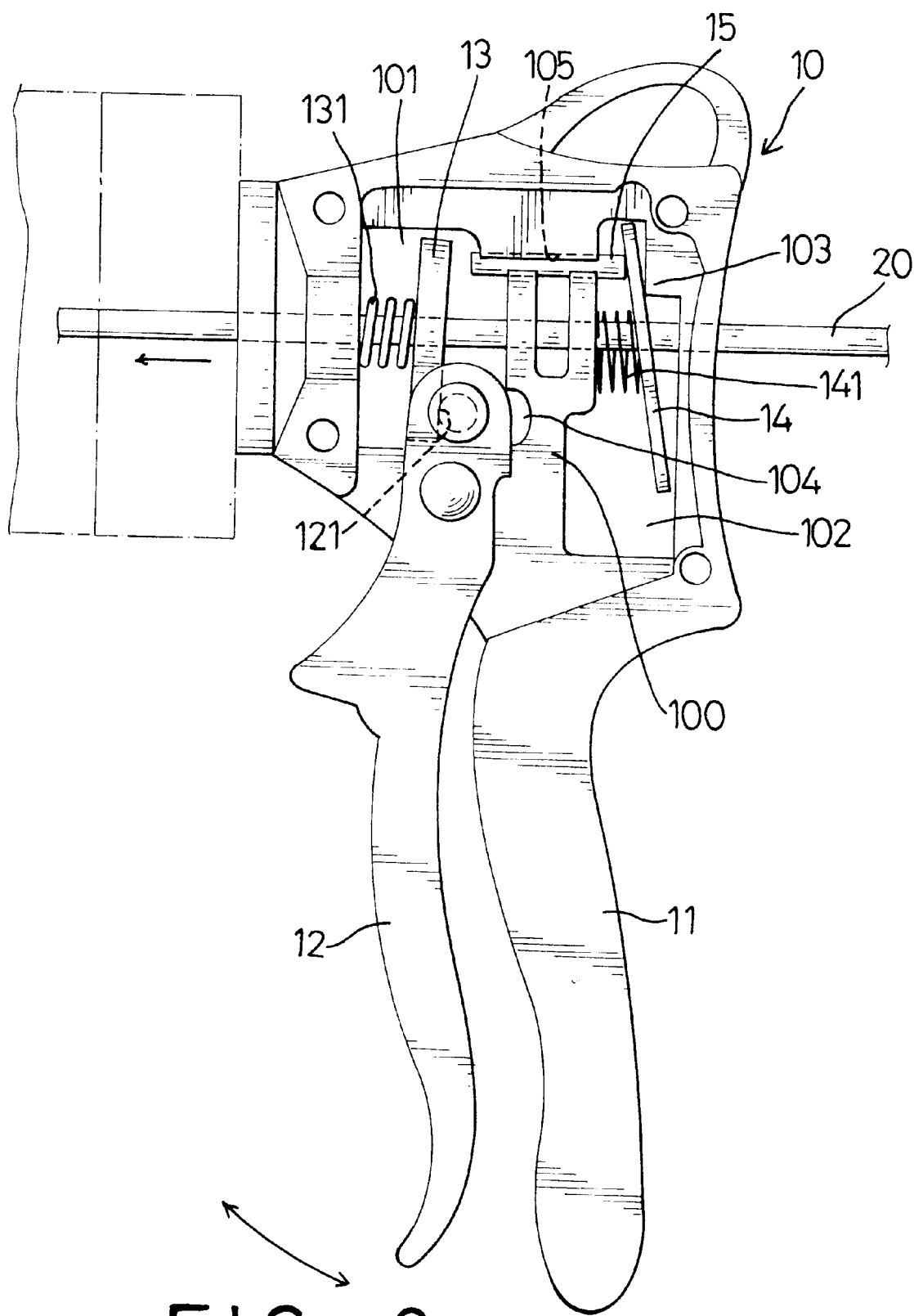
FIG. 3 is an operational side plan view of the feeding device for a caulking gun in FIG. 1.
Figure 4:
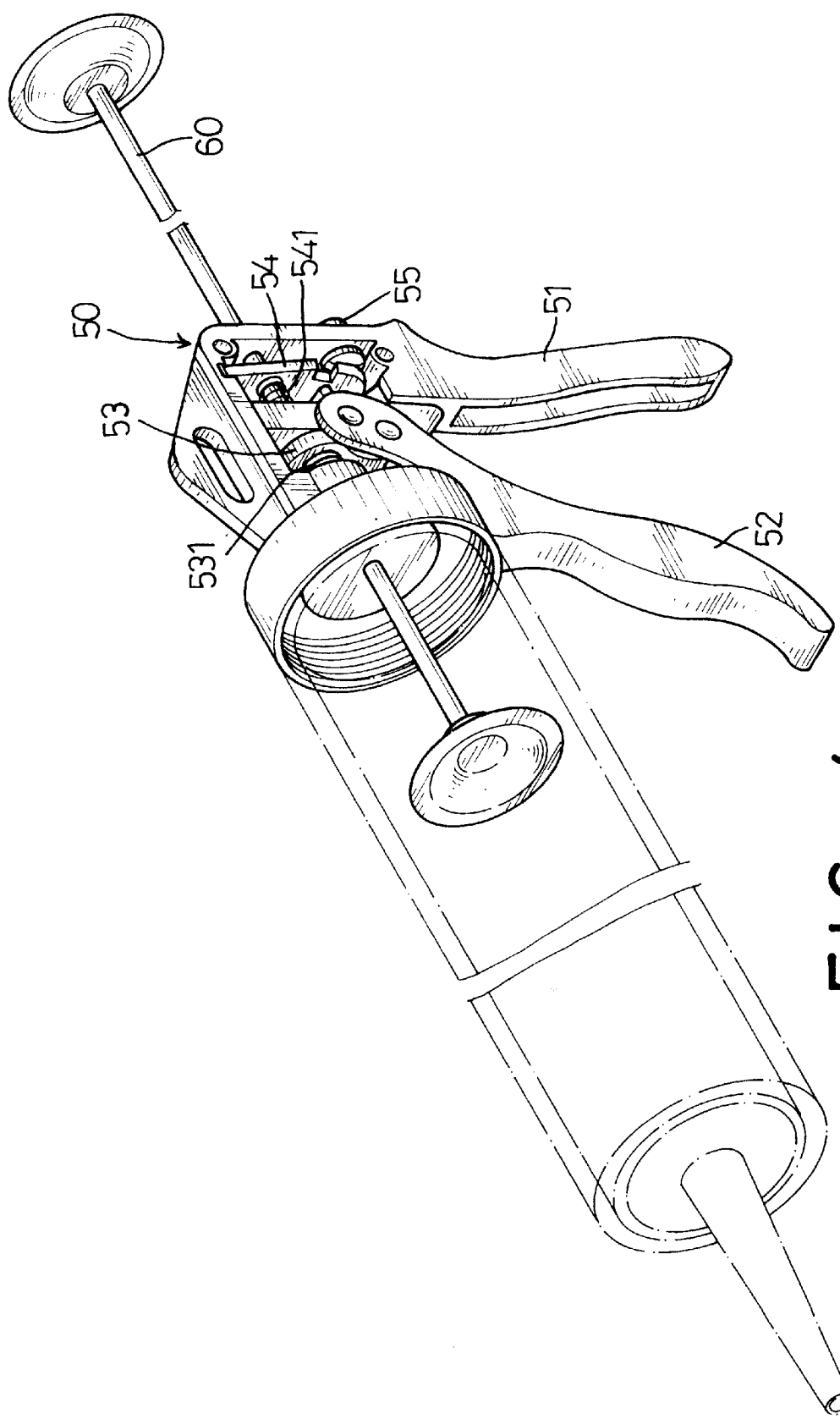
FIG. 4 is a perspective view of a feeding device for a conventional caulking gun in accordance with the prior art.
Figure 5:
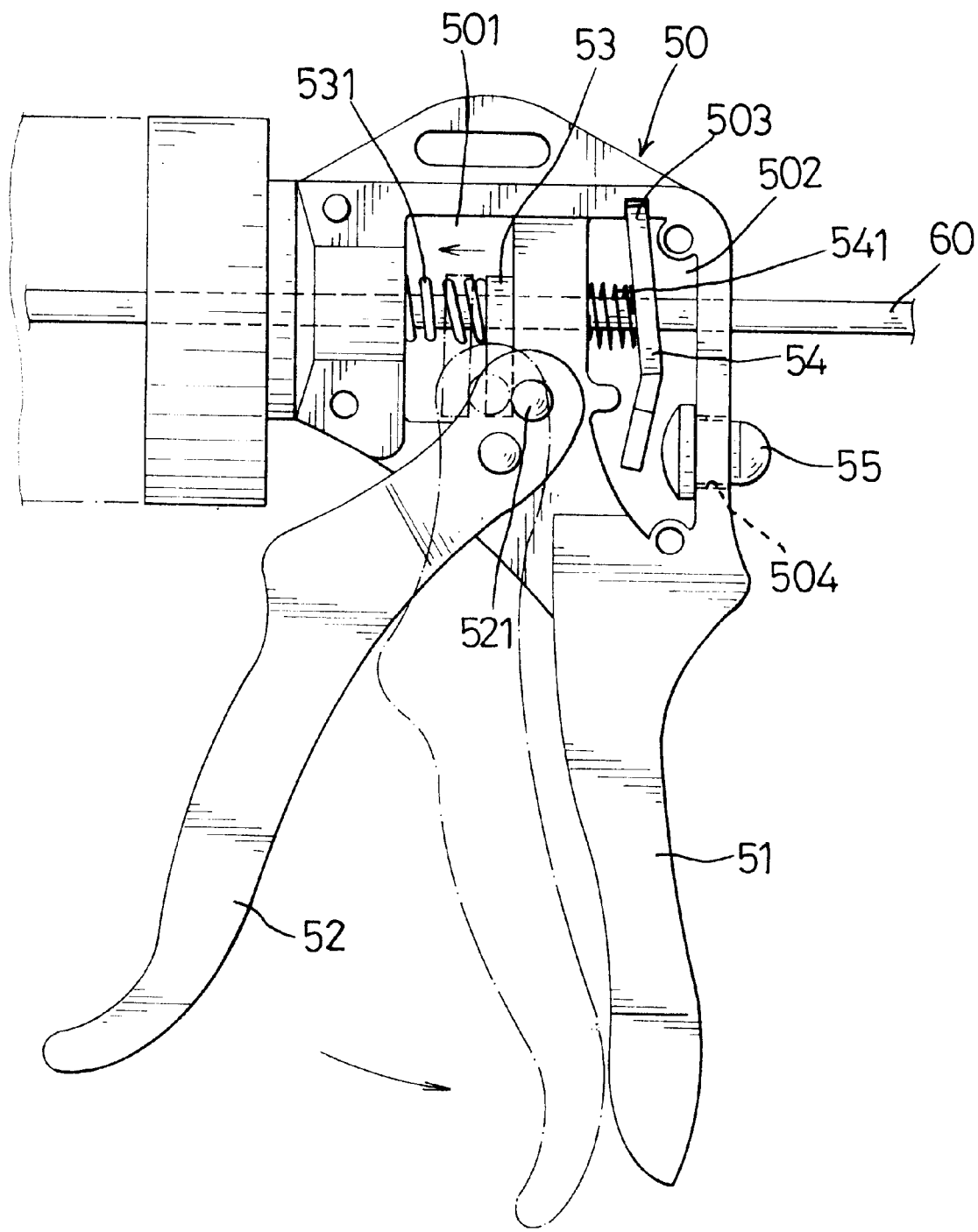
FIG. 5 is an operational side plan view of the feeding device for the conventional caulking gun in FIG. 4.
Figure 6:
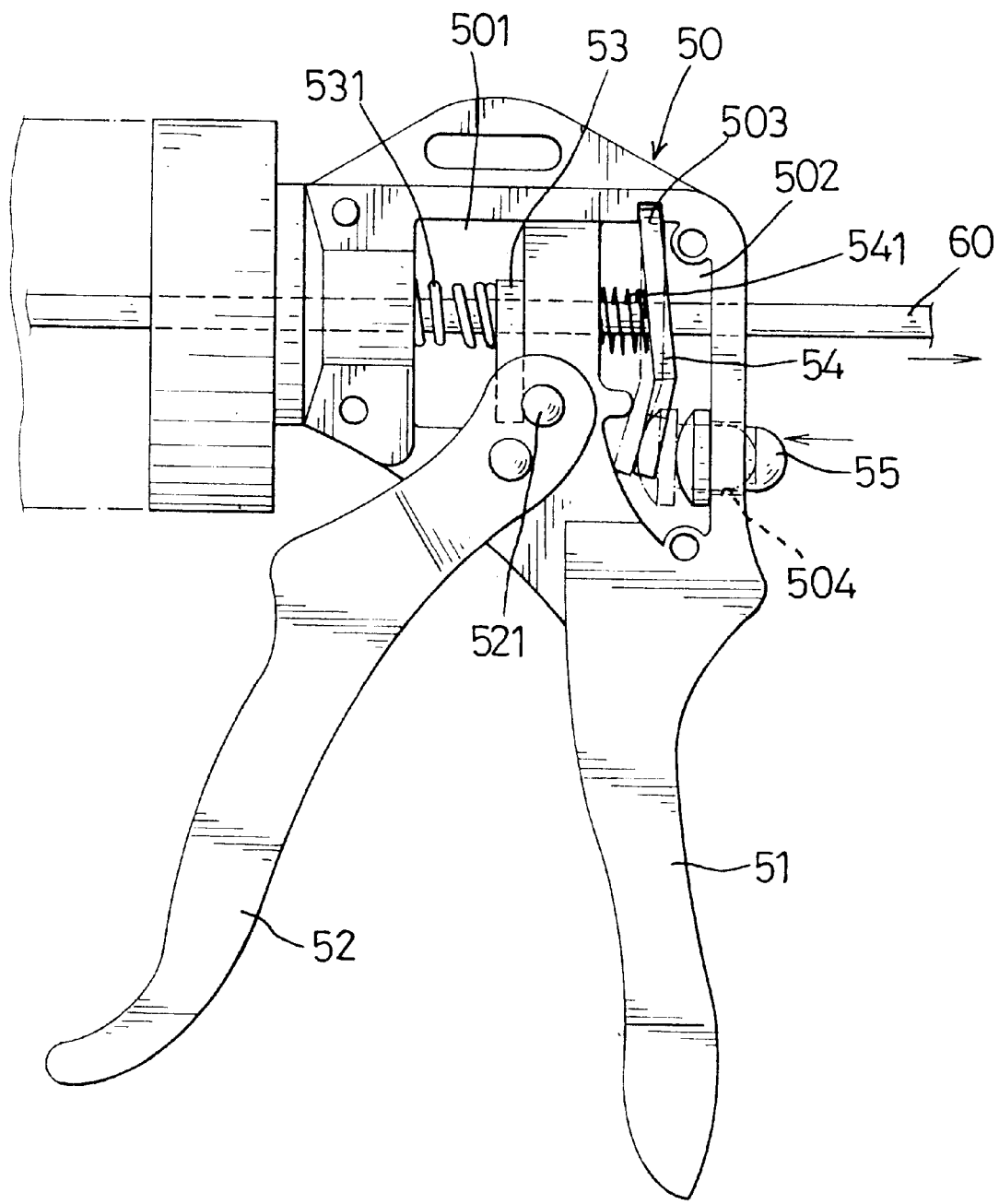
FIG. 6 is another operational side plan view of the feeding device for the conventional caulking gun in FIG. 4.

With reference to the drawings and initially to FIGS. 1, 2 and 3, a feeding device for a caulking gun in accordance with the present invention comprises a frame (10), a handle (11), a trigger (12), a plunger shaft (20), a drive grip (13), a brake grip (14), two compression springs (131, 141) and a pressure release rod (15). The frame (10) including a first recess (101), a second recess (102) defined in the frame (10) and a division wall (100) defined between the two recesses (101, 102). The handle (11) extends outward from the frame (10) below the second recess (102). The trigger (12) is pivotally attached to the frame (10) forward of the handle (11). The plunger shaft (20) extends through the frame (10) and penetrates the drive grip (13) in the first recess (101) and the brake grip (14) in the second recess (102). The drive grip (13) and the brake grip (14) each has a through hole (not numbered) to allow the plunger shaft (20) to extend through the grips (13, 14). The diameter of the through holes in the drive grip (13) and the brake grip (14) are slightly larger than the diameter of the plunger shaft (20). A pin (121) is attached to one end of the trigger and moves in the first recess (101) to push the drive grip (13). The drive grip (13) is inclined to the plunger shaft (20) to grasp the plunger shaft (20) and driving the plunger shaft (20) forward when pushed by the pin (121) attached to the trigger (12) to squeeze caulking compound out of the tube. A first compression spring (131) is mounted around the plunger shaft (20) between the forward wall of the first recess (101) and the drive grip (13) to provide a restitution force to the trigger (12) for next compression cycle of the trigger. The frame (10) includes an Ω-shaped groove (105) defined near the top portion of the division wall (100) to communicate between the first recess (101) and the second recess (102). The pressure release rod (15) is slidably received in the groove of the frame (10). A transverse recess (104) is defined in the forward wall of the division wall (100) to receive the pin (121) when the trigger (12) is released. A second compression spring (141) is mounted around the plunger shaft (20) between the forward wall of the second recess (102) and the brake grip (14). The restitution force of the first spring (131) is stronger than that of the second spring (141) so that the drive grip (13) when pressed by the first spring (131) pushes the pressure release rod (15) to force the brake grip (14) to release the plunger shaft (20). The second recess (102) has a block (103) which extends from the interior periphery of the back wall of the second recess (102) and aligns with the groove (105). The block (103) includes one side facing the brake grip (14) and perpendicular to the plunger shaft (20).

With reference to FIG. 2, when the trigger (12) is squeezed, the pin (121) pushes the drive grip (13) that engages the plunger shaft (20) and drives the plunger shaft (20) forward. When the drive grip (13) moves forward, the force pressing the pressure release rod (15) disappears and the force acting on the brake grip (14) through the pressure release rod (15) disappears, and the brake grip (14) pushes the pressure release rod (15) forward and engages the plunger shaft (20) in a single direction due to the restitution force of the second spring (141). As the plunger shaft (20) is driven forward, caulking compound is squeezed out of the tube.

With reference to FIG. 3, when the trigger (12) is released, the restitution force of the first spring (131) presses the drive grip (13) back, which in turn presses the pin (121) into the transverse groove (100) and the pressure release rod (15) along the groove (105) and against the brake grip (14). The pressure release rod (15) pushes the brake grip (14) against the vertical side of the block (103), which causes the brake grip (14) to release the plunger shaft (20). Consequently, there is no engaging force between the drive grip (13), the brake grip (14) and the plunger shaft (20) because the through holes of the drive grip (13) and the brake grip (14) each have a diameter slightly larger than that of the plunger shaft (20). The residual pressure in the caulking compound in the tube pushes the plunger shaft (20) back and stops the caulking compound from continuing to flow out of the nozzle of the tube.

To change or replace the tube, the user only needs to pull the plunger shaft (20) because the braking grip (14) is not engaged with the plunger shaft (20) when the trigger (12) is released. This feature obviates the necessity for the plunger shaft release button found in conventional caulking guns.

Although the invention has been explained in relation to its preferred embodiment, it is to be understood that many other possible modifications and variations can be made without departing from the spirit and scope of the invention as hereinafter claimed.

What is claimed is:

1. A feeding device for a caulking gun comprising:
   a frame including a first recess and a second recess defined in the frame, a division wall formed between said first recess and said second recess, and a block extending from an interior periphery of said second recess;
   a handle extending out from said frame below said second recess;
   a drive grip with a through hole in said first recess;
   a brake grip with a through hole in said second recess;
   a plunger shaft extending through said frame and penetrating said through hole in said drive grip and said brake grip, the diameter of said through holes of said drive grip and said brake grip being slightly larger than a diameter of said plunger shaft,
   a first spring mounted around the plunger shaft between a periphery of said first recess and said drive grip;
   a second spring mounted around the plunger shaft between said division wall and said brake grip, said first spring having a restitution force stronger than that of said second spring; and
   a trigger pivotally attached to said frame below said first recess to drive said drive grip and said plunger shaft forward, wherein the improvements comprises:
      a groove defined in said division wall and communicating between said first recess and said second recess, said groove corresponding to said block; and
      a pressure release rod slidably received in said groove of said frame and pushing said brake grip when the trigger pressure on said drive grip is released, such that said brake grip is forced to a vertical position relative to said plunger shaft due to said pressure release rod pressing said brake grip against said block.

2. The feeding device for a caulking gun as claimed in claim 1, wherein a pin is attached to said trigger, said pin moves in said first recess to drive said drive grip.

3. The feeding device for a caulking gun as claimed in claim 2, wherein a transverse recess is defined in the forward wall of said division wall to receive said pin when said trigger is released.

4. The feeding device for a caulking gun as claimed in claim 1, wherein said groove is Ω-shaped.

5. The feeding device for a caulking gun as claimed in claim 4, wherein a pin is attached to said trigger, said pin moves in said first recess to drive said drive grip.

6. The feeding device for a caulking gun as claimed in claim 5, wherein a transverse recess is defined in a forward wall of said division wall to receive said pin when said trigger is released.

* * * * *